Jan. 25, 1955    D. F. SMITH    2,700,461
ARTICLE OF MANUFACTURE
Filed July 19, 1952

INVENTOR
DAVID F. SMITH,
BY
Harvey W. Edelblute
ATTORNEY

United States Patent Office 2,700,461
Patented Jan. 25, 1955

2,700,461
ARTICLE OF MANUFACTURE

David F. Smith, Metuchen, N. J., assignor to Davis & Geck, Inc., Brooklyn, N. Y., a corporation of New York Application July 19, 1952, Serial No. 299,833

2 Claims. (Cl. 206—47)

This invention relates to a new article of manufacture.

Fabric bandages of cotton gauze or crinoline coated with plaster of Paris (calcium sulfate hemihydrate) have been used for some time in preparing orthopedic casts for the immobilaztion of fractures or the like. These are dipped into water and then formed into shape, after which the plaster of Paris sets to obtain a rigid and strong cast. Various modifying agents are often incorporated with the plaster of Paris on the fabric bandage to control the setting time or to bind the plaster to the cloth or to produce other desirable characteristics.

More recently, it has become the practice to dip these plaster of Paris bandages into solutions of synthetic resins which polymerize after the bandage is applied to give an orthopedic cast which has greater strength, greater hardness and much more waterproofness than in the case where the plaster of Paris bandage is merely dipped into water prior to application. In addition, it is found that the use of the resin solution for dipping the bandage results in the obtaining of a much increased strength in the cast at every stage of the drying, especially early in the drying, so that the patient can be released from the doctor's care much sooner.

Synthetic resins are of a highly variable nature and their rate of polymerization is dependent on a number of factors which are not clearly understood, particularly by those not intimately acquainted with the resin art and, as a result, doctors and nurses are not completely familiar with the conditions which govern the preparation of a satisfactory solution for dipping plaster of Paris bandages. If the resin is unduly polymerized before an attempt is made to dissolve it in water, it may fail to go into solution or may precipitate from solution before the bandaging operation is completed. Too much catalyst may result in precipitation of the resin from solution before the bandage is completed and, conversely, too little catalyst may not cause the resin to set up properly in a reasonable period of time. During the stress of the conditions that are apt to be present when orthopedic bandages are being applied, the quantity of acid catalyst that is added to the resin solution to obtain completion of the polymerization of the resin may be greatly in error or the catalyst may be omitted entirely. In view of these difficulty controllable variables, it is desirable that there be made available to doctors and nurses a product which will enable the fast and accurate preparation of resin solutions suitable for the wetting of plaster of Paris bandages.

In view of the fact that some catalysts such as, for example, ammonium chloride act upon the resin and cause its polymerization during storage before use, the catalyst cannot be mixed with the resin powder that is used in preparing the solution. Because of the lack of knowledge of the nature of the polymerization reaction by those who are apt to use such a product, it is not feasible to allow them to weigh out from another container the requisite quantity of catalyst. To overcome these disadvantages, I have prepared a new article of manufacture which comprises a quantity of resin in an individual container sufficient for the preparation of the quantity of solution that is required for dipping plaster of Paris bandages used to prepare a cast. In the same package containing the resin, I enclose a package containing the exact quantity and kind of curing catalyst for the amount of resin contained in the package. In using the invention, the doctor or nurse merely measures out the requisite amount of water and then adds the entire contents of the package containing resin and catalyst to the solution. At this point, plaster of Paris bandages may be dipped into the solution and applied to the patient.

A further and more important advantage of the invention is designed to overcome the likelihood that the acid catalyst may be left out of the resin solution through inadvertence. This is accomplished by the present invention by enclosing the catalyst in a water soluble package. The nature of the package containing the catalyst is of such nature that it will not immediately dissolve in water but, rather, will dissolve in a short time after it is immersed. In this way, the resin is allowed to completely dissolve before the catalyst is added to the solution. This is of advantage since the resin dissolves more readily in water than in ammonium chloride solution. Thus the catalyst does not retard the dissolving of the resin, yet there is no chance that the catalyst will be omitted from the solution altogether.

In order that the nature of my invention may be more easily understood, reference is made to the single sheet of drawings and the several views thereon of which:

Figure 1:
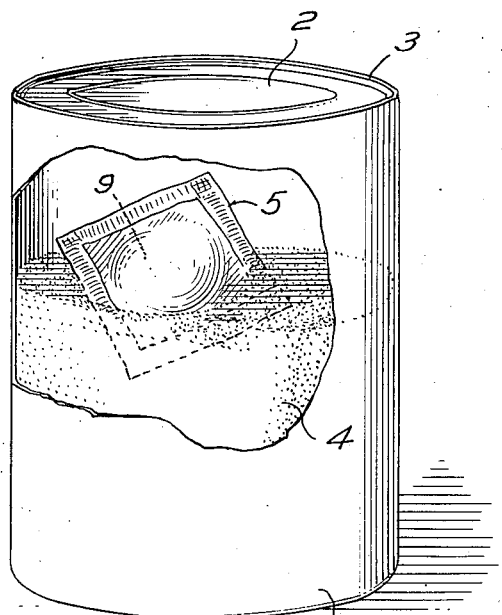
Figure 1 is a front elevation of a preferred form of the article of manufacture with parts of the container cut away showing the contents thereof.

Referring again to Figure 1, it will be seen that the new article of manufacture of the present invention may comprise a container 3 with a pryout lid 2 in top thereof. Dispersed within the container is a quantity of water soluble methylol melamine condensation product 4 and a package, or envelope, 5 of water soluble material having sealed therein an acidic polymerization catalyst 9.

Figure 2:
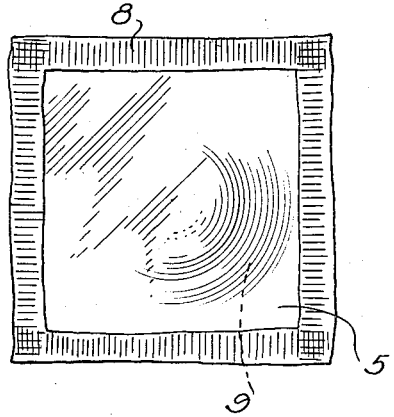
Figure 2 is a top view, slightly enlarged over Figure 1, of an envelope containing a curing catalyst.
Figure 3:
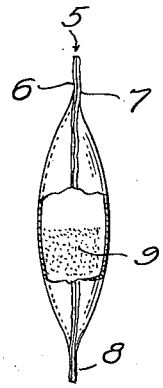
Figure 3 is a side view of the envelope of Figure 2 with parts broken away (and shown in section).

The envelope 5, as shown in Figure 2, consists simply of two sheets 6 and 7 (Figure 3) of a water soluble polyvinyl alcohol film or the like, which have been sealed on the edges 8 thereof in appropriate manner as by crimping or with an adhesive or by moistening the edges or by heat-sealing. Contained in the envelope is the desired quantity of acid catalyst 9.

Figure 4:
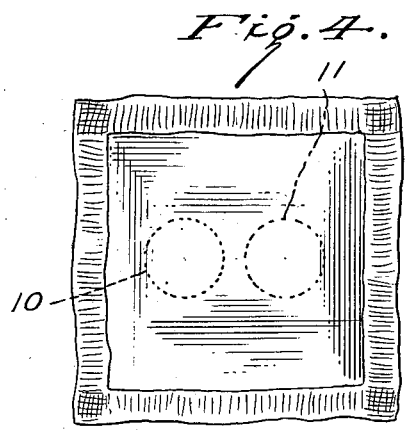
Figure 4 is a top view of an envelope containing another form of a catalyst.
Figure 5:
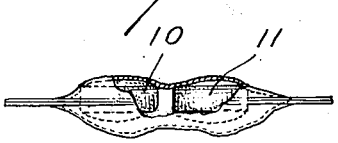
Figure 5 is a side view of the envelope of Figure 4 with parts broken away (and sectioned).

For purposes of manufacture, it may be desirable under some conditions to form the acid catalyst into pellets 10 and 11 as shown in Figures 4 and 5. One or more of these pellets may be inserted in the envelope before it is sealed. Ordinarily, they would contain a definite amount of an acidic material, such as ammonium chloride, bound together with an inert binder, such as starch, or some otther material which would readily disintegrate on contact with water, but which would not adversely affect the setting of the resin or plaster of Paris and not be irritating to the human skin. For example, granular ammonium chloride moistened with a 2% solution of soluble starch is molded into a desired shape and dried at 100° C. for two hours. The resulting catalyst is firm and easy to handle but dissolves readily when placed in water.

The resin that is placed in the container is preferably a water dispersable or water soluble methylol melamine condensation product. These water dispersable resins are well known in the art, a particularly suitable one being sold by the American Cyanamid Company under the trade name Melmac 405. These are prepared by heating 1 mol of melamine with 1½ to 3 mols of formaldehyde under substantially neutral conditions to reflux temperature for about one-half hour after which the pH of the reaction mixture is adjusted to about 10 and the reaction product is dried in trays or by spray drying. On dissolving the resin in water and on the addition of an acid polymerization catalyst, it will continue to polymerize to an insoluble resin which when used in accordance with the teachings of the present invention will add great strength to orthopedic bandages.

The preferred resin for use in practicing the invention is a dimethylol melamine condensation product which has been polymerized during the manufacture to the extent that it will dissolve in water to about 65% by weight of resin solids but when diluted with water the more highly polymerized hydrophobic components thereof will precipitate from solution at a dilution within the range of 10% to 40% by weight.

Of the various acidic polymerization catalysts that may be used in practicing the invention, I prefer ammonium chloride as it has been found to be particularly suitable when used in association with plaster of Paris. Although other acidic curing catalysts can be used, some have disadvantages in that they may be irritating to the patient's skin, possess a disagreeable odor or adversely affect the setting of the gypsum in the bandage. The amount of catalyst contained in the water solution envelope may vary from about 2.5% to 12% by weight, based on the weight of the resin in the package. If there is too much catalyst, when taking into account the concentration of the resin in the aqueous solution that is made up from the contents of the package, the resin will start to precipitate from solution too quickly. It is desired that the solution when warm will not precipitate out any considerable amount of the resin within a period of less than one-half to two and one-half hours.

The water soluble envelope may also carry other substances which may be used for special purposes such as dyes, perfumes or the like. Of particular value is the use of small amounts of urea, about 0.5 to 1.5% of the amount by weight of the resin contained in the package, to react with any free formaldehyde that may be present in the resin solution. Obviously, the amount of urea used for this purpose will depend upon the amount of free formaldehyde in the resin and may, of course, be omitted entirely when the formaldehyde content is low.

Other water soluble films may be used to make up the envelope in addition to polyvinyl alcohol such as films of methyl cellulose, carboxy methyl cellulose, gelatin, casein, sodium polyacrylate, pectin or the like or combinations of these substances with each other or with other film forming agents or modifiers. Ordinarily, these films are plasticized with glycerine or an alkalene glycol to make them flexible and to control their water solubility. The film forming substances should be of such composition and thickness as to dissolve in water in a reasonable length of time. When using films of polyvinyl alcohol, the thickness should be of the order of $2/1000$ of an inch so as to give adequate protection to the resin from the catalyst enclosed in the envelope yet dissolve and release the contents of the envelope to the resin solution within a few minutes.

To illustrate the invention in greater particularity, the following examples are given.

*Example I*

A wide mouth glass jar containing 261 grams of Melmac 405 plus an envelope of a cold water soluble polyvinyl alcohol film $2/1000$ of an inch in thickness containing 15 grams of ammonium chloride and 2.6 grams of urea is provided. When this mixture is poured into a pint of warm water, the resin envelope and contents thereof dissolve to form a solution into which plaster of Paris bandages may be dipped prior to application.

*Example II*

A one gallon can with a pryout top containing 1302 grams of Melmac 405 and a polyvinyl alcohol envelope of film $2/1000$ of an inch thick and containing 75 grams of ammonium chloride and 13 grams of urea is provided. Two and one-half quarts of warm water may be poured into this can to dissolve the contents. Plaster of Paris bandages may then be dipped into the solution in the can and applied in the usual manner.

Ordinarily, the contents of the can are dissolved in warm water as it is easier to dissolve the resin and the dipped bandages are more comfortable to the patient. When dipping some types of plaster of Paris bandages, the use of cold solutions of the resin is preferred as better results are obtained in the finished bandage.

I claim:

1. A package comprising a container having disposed therein a quantity of dimethylol melamine condensation product, a small amount of urea, and from about 2.0% to 8% by weight of ammonium chloride based upon the weight of said dimethylol melamine condensation product, said ammonium chloride being enclosed in an envelope of a water soluble polyvinyl alcohol film having a thickness of approximately two one-thousandths of an inch and thereby separated from said condensation product.

2. A package comprising a container having disposed therein a quantity of a methylol melamine condensation product, said product being soluble in water to an extent of about 65% by weight, and said solution being dilutable with water to a point within the range 10% to 40% by weight of resin solids, and 2.0% to 8% by weight of ammonium chloride based upon the weight of said methylol melamine condensation product in a water soluble envelope and thereby separated from said condensation product.

References Cited in the file of this patent

UNITED STATES PATENTS

| Number | Name | Date |
|---|---|---|
| 408,951 | Bushnell | Aug. 13, 1889 |
| 1,801,921 | Hollis | Apr. 21, 1931 |
| 2,074,758 | Reynolds | Mar. 23, 1937 |
| 2,245,738 | Taylor | June 17, 1941 |
| 2,331,955 | Beebe et al. | Oct. 19, 1943 |
| 2,539,395 | Banks | Jan. 30, 1951 |